(12) United States Patent
Pawar et al.

(10) Patent No.: US 9,866,310 B1
(45) Date of Patent: Jan. 9, 2018

(54) DYNAMIC SELECTION OF A DONOR BASE STATION TO SERVE A RELAY NODE

(71) Applicant: Sprint Spectrum L.P., Overland Park, KS (US)

(72) Inventors: Hemanth B. Pawar, Brambleton, VA (US); Chunmei Liu, Great Falls, VA (US); Krishna Sitaram, Chantilly, VA (US); Pratik Kothari, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 112 days.

(21) Appl. No.: 14/943,465

(22) Filed: Nov. 17, 2015

(51) Int. Cl.
*H04J 1/00* (2006.01)
*H04B 7/155* (2006.01)
*H04W 48/20* (2009.01)

(52) U.S. Cl.
CPC ........ *H04B 7/15507* (2013.01); *H04W 48/20* (2013.01)

(58) Field of Classification Search
CPC ...................................................... H04B 7/14
USPC ........................................................ 370/315
See application file for complete search history.

(56) References Cited

U.S. PATENT DOCUMENTS

| 7,428,217 | B2 | 9/2008 | Kobayashi et al. |
| 7,577,121 | B2 | 8/2009 | Han et al. |
| 8,391,254 | B2 | 3/2013 | Koo et al. |
| 8,423,033 | B1 | 4/2013 | Everson et al. |
| 8,634,842 | B2 | 1/2014 | Zhang et al. |
| 8,923,871 | B2 | 12/2014 | Aminaka et al. |
| 2007/0217433 | A1 | 9/2007 | Doppler et al. |
| 2008/0137591 | A1 | 6/2008 | Hirano et al. |
| 2009/0003269 | A1 | 1/2009 | Kumazawa et al. |
| 2009/0201848 | A1 | 8/2009 | Kumazawa et al. |
| 2011/0081903 | A1 | 4/2011 | Cai et al. |
| 2011/0211503 | A1 | 9/2011 | Che et al. |
| 2011/0222428 | A1 | 9/2011 | Charbit et al. |
| 2011/0228700 | A1 | 9/2011 | Mildh et al. |
| 2012/0008544 | A1 | 1/2012 | Nakagawa et al. |
| 2012/0028627 | A1 | 2/2012 | Hunzinger |
| 2012/0127872 | A1 | 5/2012 | Sheu |
| 2012/0176958 | A1 | 7/2012 | Queseth et al. |

(Continued)

FOREIGN PATENT DOCUMENTS

EP 2782293 A1 9/2014

OTHER PUBLICATIONS

Pending U.S. Appl. No. 14/147,140, filed Jan. 3, 2014.

*Primary Examiner* — Dang Ton

(57) ABSTRACT

Disclosed are methods and systems to facilitate selection of a donor base station to serve a relay node (RN). In particular, a base station system (BSS) may include a plurality of base stations each operable to serve user equipment devices (UEs) and operable to serve an RN. The RN is in turn operable to serve UEs. According to the disclosure, a controlling entity may determine both (i) a type of content communicated between the BSS and UEs served by the BSS (BSS-served content type) and (ii) a type of content communicated between the RN and UEs served by the RN (RN-served content type). Based on both the determined BSS-served content type and the determined RN-served content type, the controlling entity may select one of the plurality of base stations to serve the RN and may cause the selected base station to serve the RN.

20 Claims, 7 Drawing Sheets

(56) References Cited

U.S. PATENT DOCUMENTS

| | | |
|---|---|---|
| 2012/0218886 A1 | 8/2012 | Van Phan et al. |
| 2012/0243460 A1 | 9/2012 | Muto et al. |
| 2012/0264368 A1 | 10/2012 | Aminaka et al. |
| 2012/0324100 A1* | 12/2012 | Tomici .................. H04L 45/123 709/224 |
| 2013/0034043 A1 | 2/2013 | Yu et al. |
| 2013/0115955 A1 | 5/2013 | Deng et al. |
| 2013/0163508 A1 | 6/2013 | Yu et al. |
| 2013/0172000 A1 | 7/2013 | Van Phan et al. |
| 2013/0250766 A1 | 9/2013 | Chaudhuri et al. |
| 2013/0288694 A1 | 10/2013 | Mochizuki et al. |
| 2013/0343261 A1 | 12/2013 | Gonsa et al. |
| 2014/0126460 A1 | 5/2014 | Bienas et al. |
| 2014/0206352 A1 | 7/2014 | Mochizuki et al. |
| 2014/0301371 A1 | 10/2014 | Maeda et al. |
| 2014/0364079 A1 | 12/2014 | DiFazio et al. |
| 2015/0004930 A1 | 1/2015 | Kim et al. |

\* cited by examiner

DYNAMIC SELECTION OF A DONOR BASE STATION TO SERVE A RELAY NODE

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol (radio access technology), with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In practice, base stations in a cellular wireless network can be physically arranged in various ways. For instance, base stations may be co-located with each other by having their antenna structures at largely the same geographic location (within a defined tolerance, for instance). By way of example, a single cell site could be arranged to define two base stations with separate antenna structures on a common antenna tower or other base structure. And in another example, a single physical base station (possibly with a single antenna structure) that provides service separately on first and second carriers could be considered to define the two separate base stations, one operating on the first carrier and the other operating on the second carrier. Alternatively, base stations in a cellular wireless network can be distributed at some distance from each other. In particular, the antenna structure of a given base station may be located at a geographic location that is at some non-zero distance from the antenna structure of another base station.

With these arrangements, the base stations of a wireless service provider's network would ideally provide seamless coverage throughout a market area, so that UEs being served by the system could move from coverage area to coverage area without losing connectivity. In practice, however, it may not be possible to operate a sufficient number of base stations or to position the base stations in locations necessary to provide seamless coverage. As a result, there may be holes in coverage.

One way to help to resolve this problem is to operate a relay node (RN) that extends the range of a base station's coverage area so as to partially or completely fill a coverage hole. Such an RN may be configured with a wireless backhaul interface for communicating with and being served by the base station in much the same way that a UE does, and a wireless access interface for communicating with and serving one or more UEs in much the same way that a base station does. Further, the RN may include control logic for actively bridging the backhaul communications with the access communications. The RN may thus receive and recover downlink communications from the donor base station and may transmit those communications to the UEs served by the RN, and may likewise receive and recover uplink communications from UEs served by the RN and may transmit those communications to the base station.

In this arrangement, the base station is considered to be a "donor base station," in that the base station provides coverage to the RN and the RN then provides coverage to one or more UEs. In practice, the wireless communication link between the donor base station and the RN is considered to be a "relay backhaul link," and the wireless communication link between the RN and UEs served by the RN is considered to be a "relay access link." Further, to the extent the base donor station itself also serves UEs, the wireless communication link between the donor base station and those UEs is considered to be a "donor access link."

Advantageously, an RN like this might have a relatively small form factor, with antenna height lower than the base station and with reduced transmit power requirements and cost. Consequently, a wireless service provider may conveniently employ such RNs throughout a region to help efficiently fill coverage holes and improve service quality.

OVERVIEW

A wireless communication system may have a base station system (BSS) that includes several base stations each operable to serve one or more RNs as well as one or more UEs each on one or more carriers. In turn, the RNs may then also each serve one or more UEs, so as to fill coverage holes and improve service quality for instance. Moreover, the base stations of the BSS may be arranged in various ways.

In one case, base stations of the BSS may be co-located and may each provide coverage on different carriers, thereby effectively resulting in a BSS that is positioned in a certain physical location and that has a set of carriers to use for serving various entities. In a scenario where a BSS serves an RN over a relay backhaul link and also serves one or more UEs over one or more access links, it may be advantageous for the BSS to allocate carriers between the relay backhaul link and the one or more access links, namely, to use one or more carriers of the set for the relay backhaul link and one or more carriers of the set for the one or more access links. And since co-located base stations of the BSS may each provide coverage on different carriers, this allocation of carriers by the BSS may essentially involve selection of one or more base stations to serve an RN as well as selection of one or more base stations to serve one or more UEs.

In another case, base stations of the BSS may be distributed at some distance from each other and may each provide coverage on one or more carriers. In practice, an RN may be positioned within coverage of several such base stations and may thus be capable of being served by any of these base stations of the BSS. With this arrangement, the RN could select from among these base stations a particular base station to serve the RN on one or more carriers. As such, in both cases, at issue is then how to select a base station of the BSS to serve an RN.

Disclosed herein is a method and system for selection of a base station to serve an RN, based on consideration of types of content communicated respectively via the BSS and via the RN. In particular, a controlling entity (e.g., the BSS or the RN) may determine a type of content communicated between the BSS and UEs served by the BSS (hereafter "BSS-served content type") and may also determine a type of content communicated between the RN and UEs served by the RN (hereafter "RN-served content type"). In doing so, the controlling entity may itself determine one or both types of content and/or the controlling entity may obtain information from another entity in order to determine one or both types of content (e.g., the RN may obtain information from the BSS regarding the BSS-served content type), among other possibilities. In accordance with the disclosure, the controlling entity may then use these determined BSS-served and RN-served content types as a basis for selecting a base station of the BSS to serve the RN. And once the controlling entity selects a base station, the controlling entity may then transmit control signaling to cause the selected base station to serve the RN.

By way of example, the controlling entity may refer to mapping data that maps various combinations of BSS-served and RN-served content types to one or more base stations of the BSS. In doing so, the controlling entity may determine that the combination of the determined BSS-served and RN-served content types is mapped to a certain base station and thus that the controlling entity should select this certain base station to serve the RN. Depending on the specific combination of the determined BSS-served and RN-served content types, the selected base station could be the same as or different from the one or more base stations that serve UEs via respective access links.

For instance, if the determined BSS-served and RN-served content types each involve communication of "heavy" content (e.g., both being types of content that typically involve communication of a relatively high extent of data), then the mapping data may map the combination to a base station that is different from the one or more base stations that serve UEs via respective access links. Whereas, if the determined BSS-served and RN-served content types each involve communication of "light" content (e.g., both being types of content that typically involve communication of a relatively low extent of data), then the mapping data may map the combination to a base station that is the same as one of the one or more base stations that serve UEs via respective access links.

With this approach, the controlling entity can ensure that the BSS provides (i) sufficient capacity for communication of certain types of content to an RN being served by the BSS via a relay backhaul link as well as (ii) sufficient capacity for communication of certain types of content to UEs being served by the BSS via respective access links. As a result, this approach may eliminate (or reduce) delays in transmission of content and/or may eliminate (or reduce) loss of content being communicated between the BSS and various entities, among other outcomes.

Accordingly, in one respect, disclosed is a method operable in a wireless communication system including a BSS. The BSS includes a plurality of base stations each operable to serve UEs and each is configured to provide service on at least one carrier. Also, the BSS is operable to serve an RN and the RN is in turn operable to serve UEs. In accordance with the method, a wireless communication system (e.g., the BSS or the RN) may determine a type of content communicated between the BSS and UEs served by the BSS (BSS-served content type). Also, the wireless communication system may determine a type of content communicated between the RN and UEs served by the RN (RN-served content type). Based on both the determined BSS-served content type and the determined RN-served content type, the wireless communication system may then select one of the plurality of base stations to serve the RN. And the wireless communication system may then cause the selected base station to serve the RN.

In another respect, disclosed is a wireless communication system including (i) an RN operable to serve UEs, (ii) a BSS that includes a plurality of base stations each operable to serve UEs (and each configured to provide service on at least one carrier) and operable to serve the RN, and (iii) a controller configured to cause the wireless communication system to perform operations. The operations may involve determining a type of content communicated between the BSS and UEs served by the BSS (BSS-served content type). Also, the operations may involve determining a type of content communicated between the RN and UEs served by the RN (RN-served content type). Further, the operations may involve, based on both the determined BSS-served content type and the determined RN-served content type, selecting one of the plurality of base stations to serve the RN. Yet further, the operations may then involve causing the selected base station to serve the RN.

Further, in another respect, disclosed is a non-transitory computer-readable medium having stored thereon instructions executable by a processor to cause a wireless communication system to carry out functions such as those noted above, to facilitate selection of a donor base station to serve an RN.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
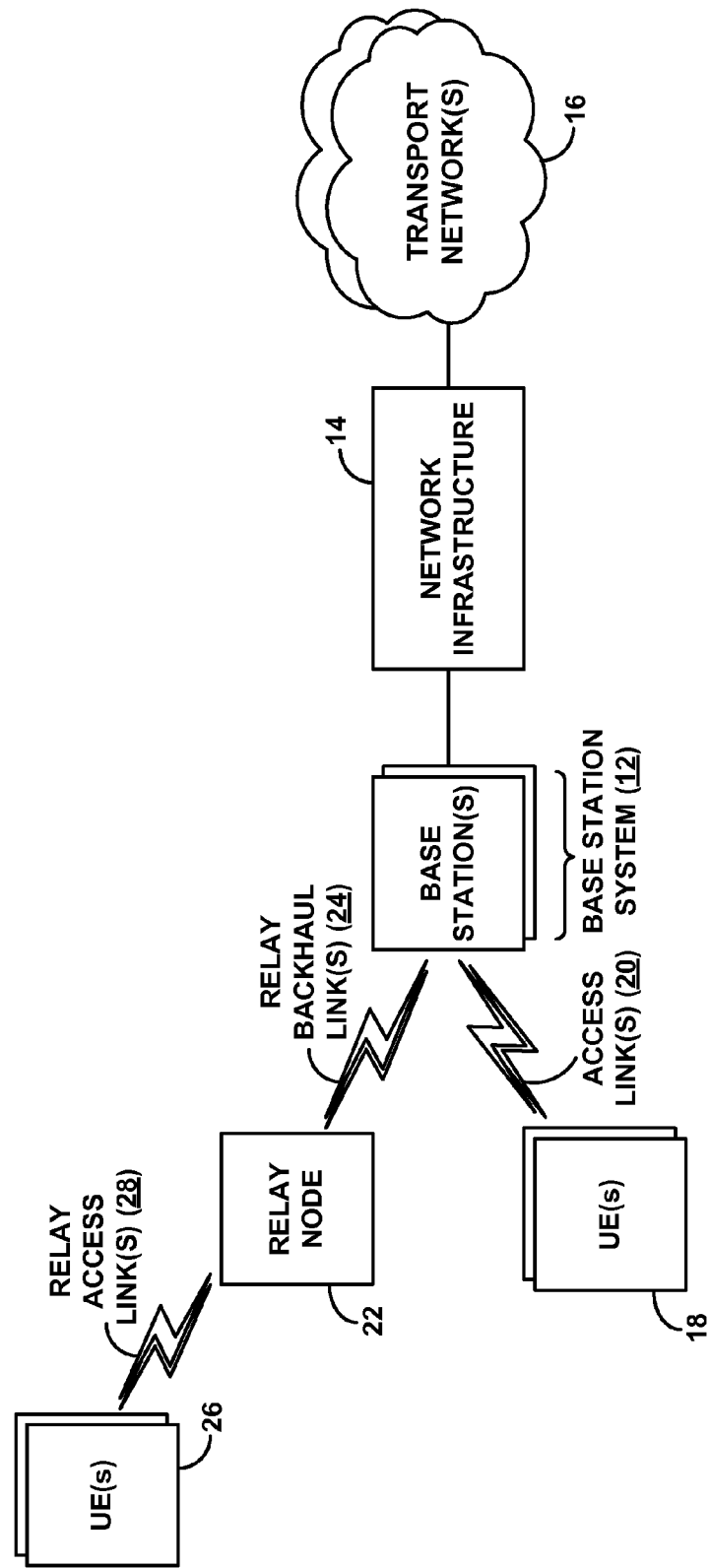
FIG. 1 is a simplified block diagram of an example communication system in which the present method can be implemented.

Referring to the drawings, as noted above, FIG. 1 is a simplified block diagram of an example communication system in which the present method can be implemented. The illustrated communication system includes a representative base station system (BSS) 12 that is interconnected with network infrastructure 14, such as a switch or gateway, providing connectivity with one or more transport networks 16 such as the PSTN and/or the Internet. Also, the BSS 12 is shown to include two or more base stations. Each such base station may be configured to serve one or more RNs and could thus be referred to as a donor base station once the base station begins to serve one or more such RNs.

As noted, at least some of the base stations of the BSS 12 may be physically co-located and/or at least some of the base stations of the BSS 12 may be at different physical locations from one another. Additionally, at least one base station of the BSS 12 may serve one or more UEs 18 respectively over one or more access links 20 and may also serve a relay node (RN) 22 over one or more relay backhaul links 24. And the RN 22 may then itself serve one or more UEs 26 respectively over one or more relay access links 28.

Through this communication system, each of the one or more UEs 18 may engage in communication on the transport network(s) 16 via at least one of the access links 20, at least one of the base stations of the BSS 12, and the network infrastructure 14. Also, each of the one or more UEs 26 may engage in communication on the transport network(s) 16 via at least one of the relay access link 28, the RN 22, at least one of the relay backhaul links 24, at least one of the base stations of the BSS 12, and the network infrastructure 14. Moreover, each base station of the BSS 12 (and/or the RN 22) may be licensed or otherwise arranged to engage in wireless communications using one or more carriers each defining a particular frequency or range of frequencies.

In an example arrangement, different co-located base stations of the BSS 12 may each provide service on a different carrier. In particular, these co-located base stations may collectively be part of a physical base station that is positioned in a certain location and that provides service on a set of one or more carriers. And when base stations of the BSS 12 are co-located in this manner, a controlling entity (e.g., the BSS 12 or the RN 22) could select one or more particular carriers of the set on which to serve certain UEs 18 and/or the RN 22. In this arrangement, the selection of carriers may effectively involve selection of one or more of the co-located base stations of the BSS 12 to serve certain UEs 18 and/or the RN 22. Once a base station of the BSS 12 is selected, the selected base station may then provide service to the appropriate entity.

In another example arrangement, different base stations of the BSS 12 may be distributed at some distance from each other and may each provide coverage on one or more carriers. When the RN 22 (and/or one of the UEs 18) is positioned within coverage of two or more such base stations of the BSS 12, the controlling entity could select at least one of these base stations to serve the RN 22 (and/or a certain one of the UEs 18). Once a base station of the BSS 12 is selected, the selected base station may then provide service to the appropriate entity.

In both arrangements, at issue is then how the controlling entity should select a base station of the BSS 12 to serve an RN, such as RN 22. The present disclosure provides for selection of a base station based on consideration of a type of content being communicated between the BSS 12 and the one or more UEs 18 (BSS-served content type) as well as based on consideration of a type of content being communicated between the RN 22 and the one or more UEs 26 (RN-served content type). In accordance with this disclosure, the controlling entity may solely rely on these considerations for selection of a base station or may rely on these considerations as additional factors for selection of a base station. Moreover, the controlling entity may carry out the process disclosed herein periodically and/or in response to various trigger events, among other possibilities.

In particular, when a controlling entity determines a type of content being communicated, the determination may involve determining a type of content communicated at one or more of various times. For instance, the controlling entity may determine a type of content currently (e.g., during the evaluation of type of content) being communicated or currently scheduled for communication. By way of example, the determination could be of a type of content currently being transmitted to or from an entity. And in another example, the determination could be of a type of content scheduled to be transmitted within a certain time period (e.g., over the following minute). In another instance, the controlling entity may determine a type of content transmitted over a recent time period, such as over the most recent ten minutes for example. In yet another instance, the controlling entity may determine a type of content communicated over a most recent sliding window of time. Other instances are possible as well.

Further, a controlling entity may determine in various ways a type of content being communicated. For example, transmission of data to a UE and/or from a UE may be in the form of one or more data packets, each having a respective payload segment carrying some or all of the data at issue and perhaps also having a header. In some cases, the data carried in the payload segment of such packets may be a digitally encoded representation of particular content being communicated. Such content may itself be media content of some type, such as voice content, web content, gaming content, video content, e-mail content, or the like. With this arrangement, a controlling entity may use various techniques (e.g., deep packet inspection (DPI)) to read one or more such packets to determine a type of content being carried by such packet(s).

In another example, the data carried in the payload segment of such packets may be a digitally encoded representation of signaling content, such as Session Initiation Protocol (SIP), Real-Time Streaming Protocol (RTSP), or Hypertext Transfer Protocol (HTTP) messages used for setting up or otherwise controlling certain media content transmission. Such signaling content may then also include data that specifies other type of content that will be communicated to or from a UE. For instance, SIP signaling could carry a Session Description Protocol (SDP) segment that designates a type of content to be communicated to or from a UE. Thus, if the payload carries SIP signaling or the like, the controlling entity could read that signaling to determine an SDP-based indication of type of content that will be communicated, again possibly a type such as one of those noted above. Other examples are possible as well.

Given the various techniques that the controlling entity may carry out to determine a type of content being communicated, the controlling entity may use one or more such techniques (and/or other techniques) to determine a respective type of content being communicated between the BSS 12 and each of the one or more UEs 18, and the controlling entity may then use these determined respective types of content as basis for determining the BSS-served content type. For instance, the controlling entity may determine the BSS-served content type by determining the type of content that is most frequently communicated between the BSS 12 and the one or more UEs 18, such as the type of content that is most frequently communicated over a certain period of time for instance. By way of example, the BSS 12 may serve nine UEs 18 and the controlling entity may seek to determine the BSS-served content type. In this example, the controlling entity may determine that eight of the UEs 18 are each currently communicating video content and that one of the UEs 18 is currently communicating voice content. As such, the controlling entity may determine that the type of content most frequently encountered in these communications is video content and may thus determine that video content is the BSS-served content type. Other examples are possible as well.

Similarly, the controlling entity may use one or more the above-mentioned techniques (and/or other techniques) to determine a respective type of content being communicated between the RN 22 and each of the one or more UEs 26, and the controlling entity may then use these determined respective types of content as basis for determining the RN-served content type. For instance, the controlling entity may determine the RN-served content type by determining the type of content that is most frequently communicated between the RN 22 and the one or more UEs 26, such as the type of content that is most frequently communicated over a certain period of time for instance. By way of example, the RN 22 may serve ten UEs 26 and the controlling entity may seek to determine the RN-served content type. In this example, the controlling entity may determine that seven of the UEs 26 are each currently communicating web content, that two of the UEs 26 are each currently communicating voice content, and that one of the UEs 26 is currently communicating gaming content. As such, the controlling entity may determine that the type of content most frequently encountered in these communications is web content and may thus determine that web content is the RN-served content type. Other examples are possible as well.

When the controlling entity determines the BSS-served content type and/or the RN-served content type, the controlling entity may sometimes obtain information from one or more other entities in order to determine these content types. For example, if the controlling entity is the RN 22, then the RN 22 may (e.g., periodically or upon request) obtain information from the BSS 12 or from another entity. In one case, the RN 22 may receive from the BSS 12 an indication of a respective type of content being communicated between the BSS 12 and each of the one or more UEs 18. And the RN 22 may then itself use the received information to determine the BSS-served content type, such as with the techniques discussed above for instance. In another case, the RN 22 may simply receive from the BSS 12 an indication of the BSS-served content type, such as after the BSS 12 itself determines the BSS-served content type.

In another example, if the controlling entity is the BSS 12, then the BSS 12 may (e.g., periodically or upon request) obtain information from the RN 22 or from another entity. In one case, the BSS 12 may receive from the RN 22 an indication of a respective type of content being communicated between the RN 22 and each of the one or more UEs 26. And the BSS 12 may then itself use the received information to determine the RN-served content type, such as with the techniques discussed above for instance. In another case, the BSS 12 may simply receive from the RN 22 an indication of the RN-served content type, such as after the RN 22 itself determines the RN-served content type. Alternatively, the BSS 12 may not obtain information from another entity and may itself determine the RN-served content type by evaluating the types of content being communicated via the one or more relay backhaul link 24 to or from the RN 22 (and thus evaluating the types of content ultimately being communicated to or from the one or more UEs 26 via one or more relay access links 28). Other examples are possible as well.

Once the controlling entity determines the BSS-served and RN-served contents types, the controlling entity may then use these determined types of content as a basis for selection of a base station to serve the RN 22. To do so, the controlling entity may carry out at least one of several example implementations of the process disclosed herein. These implementations are discussed in more detail below.

In a first example implementation, selection of a base station may involve evaluation of respective data-quantity levels of the BSS-served and RN-served content types. Each such data-quantity level may define an extent of data (e.g., a data size, a range of data sizes, and/or a set of data sizes) typically transmitted during communication of a certain type of content. For instance, one data-quantity level (e.g., a "heavy" data-quantity level) may define a first range of data sizes and another data-quantity level (e.g., a "light" data-quantity level) may define a second range of data sizes, with the data sizes of the first range being higher than the data sizes of the second range. In this instance, communication of certain types of content (e.g., video content) may typically involve transmission of respective data sizes that are each within the first range and thus these certain types of content may be of a "heavy" data-quantity level. Whereas, communication of other types of content (e.g., web content) may typically involve transmission of respective data sizes that are each within the second range and thus these other types of content may be of a "light" data-quantity level. Other data-quantity levels are possible as well.

Figure 2:
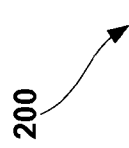
FIG. 2 is a table that illustrates mapping of certain content types to certain data-quantity levels, in accordance with an example embodiment.

In this implementation, the controlling entity may thus determine that the BSS-served content type is of a first data-quantity level as well as that the RN-served content type is of a second data-quantity level (may be the same as or different from the first data-quantity level). For instance, the controlling entity may do so by referring to a data storage containing mapping data that maps certain types of content to certain data-quantity levels. By way of example, FIG. 2 illustrates a table 200 that is representative of such mapping data. In particular, video and gaming content types are each shown to be of a "heavy" data-quantity level. Also, web and e-mail content types are each shown to be of a "light" data-quantity level. Other examples are possible as well.

Once the controlling entity determines the first and second data-quantity levels, the controlling entity may then select a base station based at least in part on these determined first and second data-quantity levels. For example, the controlling entity may determine that the BSS-served and RN-served content types are each of a "heavy" data-quantity level (e.g., the BSS-served content type being video content and the RN-served content type being gaming content). Based on these data-quantity levels, the controlling entity may determine that different base stations should respectively serve the RN 22 and other UEs 18, so as to avoid having the same base station transmit "heavy" content to and from the RN 22 as well as "heavy" content to and from other UEs 18. As such, if a certain base station of the BSS 12 is serving UEs 18 via one or more access links, then the controlling entity may select a base station of the BSS 12 other than the base station serving these UEs 18. And the controlling entity may then cause the selected base station to serve the RN 22.

In another example, the controlling entity may determine that the BSS-served and RN-served content types are each of a "light" data-quantity level (e.g., the BSS-served content type being web content and the RN-served content type being e-mail content). Based on these data-quantity levels, the controlling entity may determine that the same base station should serve both the RN 22 and other UEs 18 due to the base station likely having sufficient capacity to transmit both the RN-served and BSS-served content types. As such, if a certain base station of the BSS 12 is serving UEs 18 via one or more access links, then the controlling entity may select the same base station of the BSS 12 and may then cause the same base station to serve the RN 22.

In some situations, the controlling entity may determine that the BSS-served served content type is of a "heavy" data-quantity level (e.g., video content) and that RN-served content type is of a "light" data-quantity level (e.g., web content), or vice versa. In these situations, the controlling entity could carry out one of at least two different sets of actions, with a desired set of actions being established by way of manual engineering input for instance. In one case, the controlling entity could determine that the same base station should serve both the RN 22 and other UEs 18. So if a certain base station of the BSS 12 is serving UEs 18 via one or more access links, then the controlling entity may select the same base station of the BSS 12 and may then cause the same base station to serve the RN 22. And in another case, the controlling entity could determine that different base stations should respectively serve the RN 22 and other UEs 18. So if a certain base station of the BSS 12 is serving UEs 18 via one or more access links, then the controlling entity may select a base station of the BSS 12 other than the base station serving these UEs 18. And the controlling entity may then cause the selected base station to serve the RN 22.

In a second example implementation, the controlling entity may select a base station based on the specific combination of the BSS-served and RN-served content types being communicated rather than simply based on respective data-quantity levels of the content types (as discussed in the first example implementation). The second example implementation may be advantageous when the controlling entity encounters one of various combinations of BSS-served and RN-served content types that each include one content type that is of a "heavy" data-quantity level and another content type that is of a "light" data-quantity level. More specifically, the second example implementation may involve the controlling entity making a selection by evaluating each such combination individually rather than making an identical selection (e.g., selecting different base stations to respectively serve the RN 22 and other UEs 18) each time that such a combination is encountered. So depending on the specific combination of content types, the controlling entity could select either the same base station to serve both the RN 22 and other UEs 18 or different base stations to respectively serve the RN 22 and other UEs 18. The second example implementation is described in more detail below.

In particular, the controlling entity may refer to data storage containing mapping data that maps various combinations of BSS-served and RN-served content types to one or more base stations of the BSS 12, with each such base station being a candidate to serve the RN 22. In doing so, the controlling entity may determine that the combination of the determined BSS-served and RN-served content types is mapped to a certain base station and thus that the controlling entity should select this certain base station to serve the RN 22. In some cases, the mapping data may also map various combinations of BSS-served and RN-served content types to one or more base stations of the BSS 12, with each such base station being a candidate to serve one or more of the UEs 18. As such, depending on the specific combination of the determined BSS-served and RN-served content types, the base station that is selected to serve the RN 22 could be the same as or different from the one or more base stations that serve one or more UEs 18 via respective access links.

With this implementation, the mapping data may be arranged to ensure that the BSS 12 provides sufficient capacity for communication of both the BSS-served and RN-served content types. For instance, if the determined BSS-served and RN-served content types are both of a "heavy" data-quantity level, then the mapping data may ensure that the combination of the determined BSS-served and RN-served content types is mapped to a certain base station to serve the RN 22 and to a different base station to serve one or more of the UEs 18. In another instance, if at least one of the determined BSS-served and RN-served content types is voice content, then the mapping data may similarly ensure that the combination of the determined BSS-served and RN-served content types is mapped to a certain base station to serve the RN 22 and to a different base station to serve one or more of the UEs 18, thereby increasing capacity for communication of voice content. Other instances are possible as well.

Figure 3:
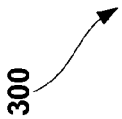
FIG. 3 is a table that illustrates mapping of certain combinations of content types to certain base stations, in accordance with an example embodiment.

FIG. 3 illustrates a table 300 that is representative of mapping data that maps various combinations of BSS-served and RN-served content types to at least one base stations of the BSS 12. As shown, if the BSS-served content type is video content and the RN-served content type is web content, then the controlling entity may select a base station 302 to serve both the RN 22 and one or more of the UEs 18. Whereas, if the BSS-served content type is web content and the RN-served content type is voice content, then the controlling entity may select a base station 302 to serve the RN 22 and may select a different base station 304 to serve one or more of the UEs 18. Additionally, if the BSS-served and RN-served content types are both gaming content, then the controlling entity may select a base station 304 to serve the RN 22 and may select a different base station 302 to serve one or more of the UEs 18. Further, if the BSS-served content type is web content and the RN-served content type is e-mail content, then the controlling entity may select a base station 302 to serve both the RN 22 and one or more of the UEs 18. Other illustrations are possible as well.

In the above-described implementations, the controlling entity carries out selection of a base station by evaluating the BSS-served content type. In some situations, however, different base stations of the BSS 12 may communicate different types of content to or from one or more of the UEs 18. And given that different base stations of the BSS 12 may communicate different types of content, the controlling entity could pair the RN-served content type with a certain content type upon selection of a certain base station or could pair the RN-served content type with a different content type upon selection of a different base station, thereby resulting in different combinations of content types depending on the particular base station that is selected. Hence, a third example implementation of the selection process may involve the controlling entity evaluating the specific type of content communicated by each of various base stations of the BSS 12.

In particular, the BSS 12 may include at least first and second base stations. The first base station may communicate a first BSS-served content type to or from one or more of the UEs 18 and the second base station may communicate a second BSS-served content type to or from one or more of the UEs 18. Also, these first and second BSS-served content types may be the same as one another or different from one another. In this implementation, the controlling entity may determine the first and second BSS-served content types as well as the RN-served content type. And based on the determined content types, the controlling entity may then select the first base station or the second base station to serve the RN 22.

To carry out selection of a base station based on consideration of the first and second BSS-served content types as well as the RN-served content type, the controlling entity may compare (i) a first pairing of the determined first BSS-served content type and the determined RN-served content type to (ii) a second pairing of the determined second BSS-served content type and the determined RN-served content type. And the controlling entity may then select the first base station or the second base station based on this comparison. For instance, the controlling entity may determine whether or not the first and second pairings are each permitted and may then compare the pairings based on each such pairing being permitted or not permitted. To do so, the controlling entity may refer to data storage containing mapping data that maps certain pairings of content types to an indication of whether or not a respective pairing is permitted. By way of example, the mapping data may indicate that a pairing of video content and gaming content is not permitted. Also, the mapping data may indicate that a pairing of video content and web content is permitted.

Accordingly, if the first pairing is permitted and the second pairing is not permitted, then the controlling entity may responsively select the first base station to serve the RN 22. In another case, if the second pairing is permitted and the first pairing is not permitted, then the controlling entity may responsively select the second base station to serve the RN 22. In yet another case, if the first and second pairings are both permitted or are both not permitted, then the controlling entity may make other comparisons related to the first and second base stations. In this implementation, such other comparisons may take various forms and a controlling entity may carry out these other comparisons in any order. Moreover, the controlling entity could also carry out one or more of these other comparisons in place of comparing the pairings based on each pairing being permitted or not permitted as discussed above.

In one example comparison, the controlling entity may determine and compare priority levels each indicating a priority of communicating a certain pairing of content types via the same base station. To do so, the controlling entity may refer to data storage containing mapping data that maps certain pairings of content types to certain priority levels. For example, a pairing of web content with other web content (e.g., a pairing of "light" content with other "light" content) may have a higher priority level than a pairing of web content and video content (e.g., a pairing of "light" content"with "heavy" content). As such, the controlling entity may determine a priority level for each of the first and second pairings and may then select the first base station or the second base station based on a comparison of the determined priority levels. More specifically, if the priority level of the first pairing is higher than the priority level of the second pairing, then the controlling entity may responsively select the first base station to serve the RN 22. Whereas, if the priority level of the second pairing is higher than the priority level of the first pairing, then the controlling entity may responsively select the second base station to serve the RN 22.

In another example comparison, the controlling entity may compare a count of RNs that the first base station serves to a count of RNs that the second base station serves. In particular, the controlling entity may do so in response to the first and second pairings both being permitted, in response to the first and second pairings both being not permitted, and/or in response to priority levels of the first and second pairings being the same, among other possible situations. Regardless of the situation, the controlling entity may determine a first count of RNs that the first base station serves as well as a second count of RNs that the second base station serves. The controlling entity may determine these counts in various ways. For example, the controlling entity may refer to a counter (e.g., a digital counter) that increments each time a new relay backhaul link is established and decrements each time a relay backhaul link is torn down. Thus, one or more such counters may determine the respective counts for the first and second base stations.

In this example comparison, once the controlling entity determines the first and second counts, the controlling entity may determine whether (i) the first count is lower than the second count or (ii) the second count is lower than the first count. If the controlling entity determines that the first count is lower than the second count, then the controlling entity may responsively select the first base station to serve the RN 22. And if the controlling entity determines that the second count is lower than the first count, then the controlling entity may responsively select the second base station to serve the RN 22. In this manner, the controlling entity may ensure that a base station having a relatively lower number of relay backhaul links ends up serving the RN 22 via an additional relay backhaul link, so as to not overburden another base station having a relatively higher number of relay backhaul links. Other instances are also possible.

Figure 4:
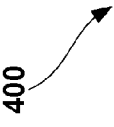
FIG. 4 is a table that illustrates selection between multiple base stations, in accordance with an example embodiment.

FIG. 4 shows a table 400 that illustrates selection between multiple base stations. In one example, the controlling entity compares a first pairing of video content (e.g., RN-served content type) and web content (e.g., BSS-served content type of base station 402) to a second pairing of video content (e.g., RN-served content type) and other video content (e.g., BSS-served content type of base station 404). In this example, the controlling entity may determine that the first pairing is permitted and that the second pairing is not permitted. And the controlling entity may responsively select base station 402 to serve the RN 22.

In another example, the controlling entity compares a first pairing of web content (e.g., RN-served content type) and video content (e.g., BSS-served content type of base station 402) to a second pairing of web content (e.g., RN-served content type) and other web content (e.g., BSS-served content type of base station 404). In this example, the controlling entity may determine that the first and second pairing are each permitted and that a priority level of the second pairing is higher than a priority level of the first pairing. And controlling entity may responsively select base station 404 to serve the RN 22.

In yet another example, the controlling entity compares a first pairing of gaming content (e.g., RN-served content type) and e-mail content (e.g., BSS-served content type of base station 402) to a second pairing of gaming content (e.g., RN-served content type) and video content (e.g., BSS-served content type of base station 404). In this example, the controlling entity may determine that the first pairing is permitted and that the second pairing is not permitted. And the controlling entity may responsively select base station 402 to serve the RN 22.

In yet another example, the controlling entity compares a first pairing of e-mail content (e.g., RN-served content type) and gaming content (e.g., BSS-served content type of base station 402) to a second pairing of e-mail content (e.g., RN-served content type) and video content (e.g., BSS-served content type of base station 404). In this example, the controlling entity may determine that the first and second pairing are each permitted and that a priority level of the second pairing is the same as a priority level of the first pairing. As such, the controlling entity may responsively carry out a further comparison, such as by comparing a count of RNs that the base station 402 serves to a count of RNs that the base station 404 serves for instance. Other examples and implementations are possible as well.

Once the controlling entity selects a base station to serve the RN 22, the controlling entity may then cause the selected base station to serve the RN 22. If the controlling entity is the BSS 12, then the BSS 12 may simply reconfigure itself to have the selected base station serve the RN 22. Whereas, if the controlling entity is the RN 22, then the RN 22 may transmit to the BSS 12 a directive indicating that the selected base station should serve the RN 22 and the BSS 12 may then responsively reconfigure itself to have the selected base station serve the RN 22.

In either case, the reconfiguring may be carried out in various ways. For example, if another base station of the BSS 12 is already serving the RN 22, then the reconfiguring may involve tearing down a bearer connection that was established between this other base station and the RN 22 and/or tearing down respective tunnels established for carrying bearer data between this other base station and the transport network. Additionally, the reconfiguring may involve establishing a relay backhaul link between the selected base station and the RN 22 as well as at least one logical bearer between the RN 22 and the network infrastructure 14, with the bearer including a radio portion extending between the RN 22 and the select base stations and an access portion extending between the base station and a gateway of the network infrastructure 14. Other examples are possible as well.

Figure 5:
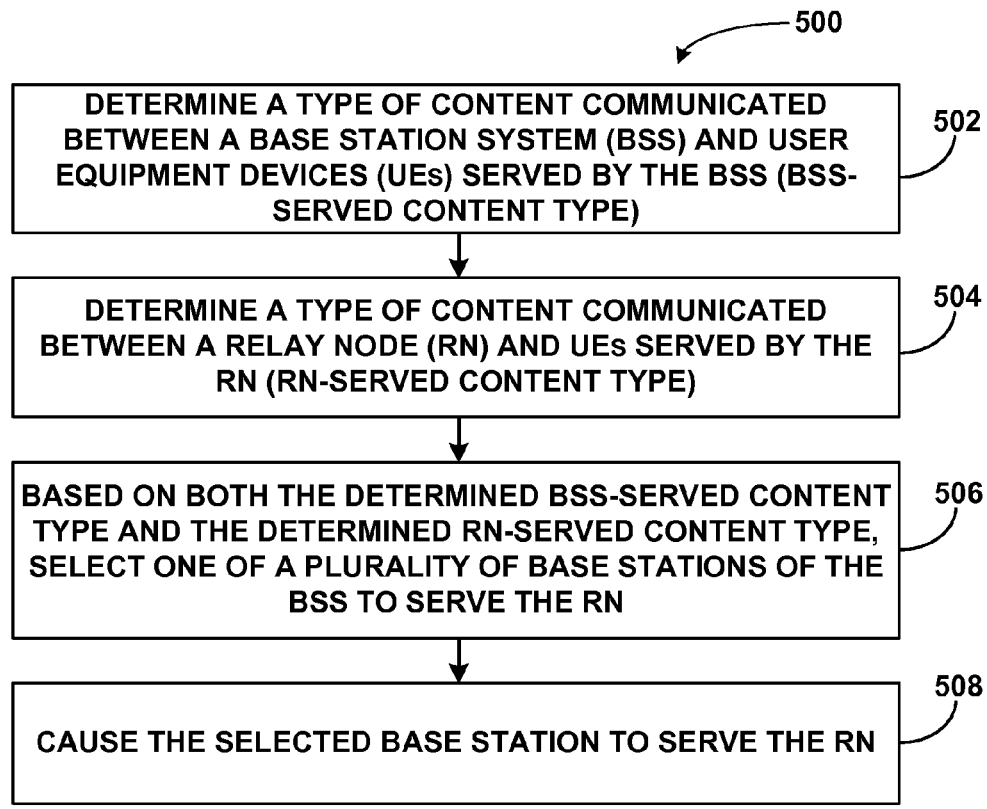
FIG. 5 is a flowchart illustrating a method to facilitate selection of a donor base station to serve a relay node, in accordance with an example embodiment.

FIG. 5 is next a flow chart illustrating a method 500, according to an example embodiment. Illustrative methods, such as method 500, may be carried out in whole or in part by component(s) and/or arrangement(s) in a wireless communication system, such as by the one or more of the components of the representative network shown in FIG. 1, with one or more of the components of the BSS shown in FIG. 6 and further discussed below, and/or with one or more of the components of the relay node shown in FIG. 7 and further discussed below. However, it should be understood that example methods, such as method 500, may be carried out by other entities or combinations of entities as well as in other arrangements, without departing from the scope of the disclosure.

In particular, method 500 may be operable in a wireless communication system including a BSS. The BSS may then include a plurality of base stations each operable to serve UEs and operable to serve an RN. The RN is in turn operable to serve UEs. And each base station is configured to provide service on at least one carrier. Accordingly, as shown by block 502 in FIG. 5, method 500 involves determining a type of content communicated between the BSS and UEs served by the BSS (BSS-served content type). At block 504, method 500 then involves determining a type of content communicated between the RN and UEs served by the RN (RN-served content type). At block 506, method 500 then involves, based on both the determined BSS-served content type and the determined RN-served content type, selecting one of the plurality of base stations to serve the RN. And at block 508, method 500 then involves causing the selected base station to serve the RN.

Figure 6:
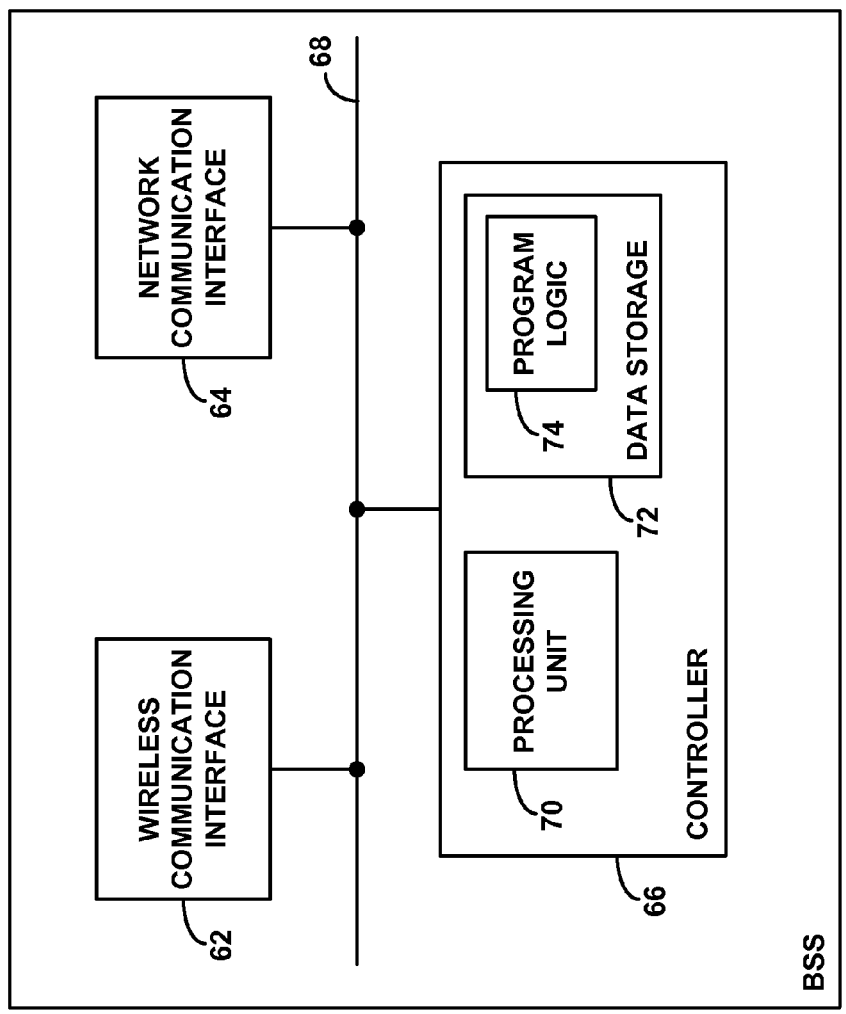
FIG. 6 is a simplified block diagram of a base station system operable in the present method.

FIG. 6 is next a simplified block diagram of a representative BSS, such as a BSS including one or more base stations each taking the form of a base transceiver station, of an access node, of an access point, of a Node-B, or of an eNodeB, for instance (whether macro, femto or the like), illustrating some of the components that can be included in such an entity configured to operate in accordance with the present disclosure. As shown in FIG. 6, the representative BSS includes at least one wireless communication interface 62, at least one network interface 64, and at least one controller 66, all of which may be integrated together in various ways and/or coupled together by a system bus, network, or other connection mechanism 68.

Each wireless communication interface 62 may function to wirelessly serve various entities, such as UEs and a relay node as discussed above, communicating over a access link with one or more UEs and over a relay backhaul link with a relay node. As such, each wireless communication interface 62 may comprise at least one antenna arrangement (not shown) for a respective base station of the representative BSS, which may be tower mounted, and associated components such as at least one power amplifier and at least one cell site modem (not shown), so as to transmit and receive bearer and control data. Each network interface 64 may comprise a wired or wireless interface for communicating with various network infrastructure.

Controller 66 may then function to cause the BSS to carry out various functions described herein, such as facilitate selection of a donor base station of the BSS to serve an RN. As such, controller 66 could take various forms. For instance, as shown, the controller 66 may include a processing unit 70 (e.g., one or more general purpose or special purpose processors) and data storage 72 (e.g., volatile and/or non-volatile storage such as magnetic, optical, flash or other storage) holding program logic 74 (e.g., machine language instructions) executable by the processing unit to carry out the various BSS functions.

Figure 7:
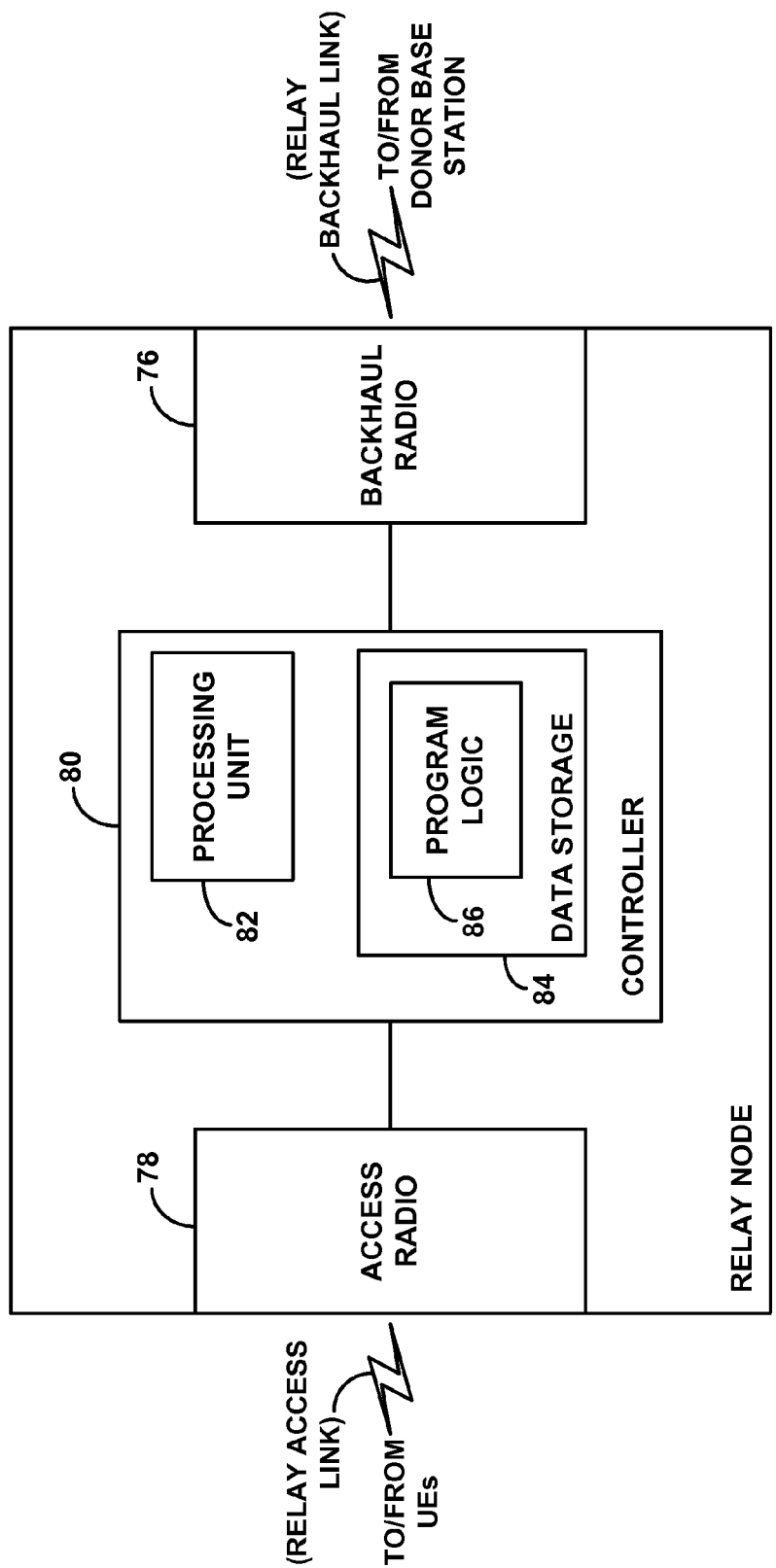
FIG. 7 is a simplified block diagram of a relay node operable in the present method.

Finally, FIG. 7 is a simplified block diagram of a representative relay node, illustrating some of the components that can be included in such an entity. As shown, the representative relay node includes a wireless communication module comprising a backhaul radio 76 and an access radio 78, and a controller 80 for bridging communications between the backhaul radio and access radio. Although the figure depicts these components as discrete blocks, the components may be integrated together in various ways or provided in other forms. For instance, the backhaul radio 76 and access radio 78 may be integrated together, perhaps on a single chipset. Further, the controller 80 may be integrated with either or both of the radios. Still further, although the figure depicts the controller with direct links to each of the radios, in an alternative arrangement the relay base station may include a system bus, network, or other connection mechanism to which the radios and controller may be communicatively linked. Other arrangements are possible as well.

In the illustrated relay node, the backhaul radio 76 may function to engage in backhaul wireless communication with a donor base station via a relay backhaul link. To facilitate this, backhaul radio 76 may be largely the same type of radio that would be included in a UE designed to be served by a base station. The backhaul radio 76 may thus include an antenna arrangement (not shown) and associated components to facilitate transmitting and receiving bearer and control data in communication with the donor base station. The access radio 78, on the other hand, may function to engage in access wireless communication with the one or more UEs via a relay access link. To facilitate this, the access radio 78 may be largely the same type of radio that would be included in a base station designed to serve such UEs. The access radio 78 may thus include an antenna arrangement (not shown) and associated components to facilitate transmitting and receiving bearer and control data in communication with the one or more UEs.

Controller 80, in turn, may function to actively bridge communications of the backhaul radio 76 with communications of the access radio 78, and thus to bridge certain relay backhaul link communications with certain relay access communications. In the example arrangement shown, controller 80 includes a processing unit 82 (e.g., one or more general purpose or special purpose processors) and data storage 84 (e.g., volatile and/or non-volatile storage such as magnetic, optical, flash or other storage) holding program logic 86 (e.g., machine language instructions) executable by the processing unit to carry out various relay node functions.

Exemplary embodiments have been described above. It should be understood, however, that variations from these embodiments are possible, while remaining within the true spirit and scope of the invention.

We claim:

1. A method operable in a wireless communication system comprising a base station system (BSS), wherein the BSS comprises a plurality of base stations each operable to serve user equipment devices (UEs) and operable to serve a relay node (RN), wherein the RN is in turn operable to serve UEs, and wherein each base station is configured to provide service on at least one carrier, the method comprising:
    determining a type of content communicated between the BSS and UEs served by the BSS (BSS-served content type);
    determining a type of content communicated between the RN and UEs served by the RN (RN-served content type);
    based on both the determined BSS-served content type and the determined RN-served content type, selecting one of the plurality of base stations to serve the RN; and
    causing the selected base station to serve the RN.

2. The method of claim 1,
    wherein determining the BSS-served content type comprises the BSS determining the BSS-served content type,
    wherein determining the RN-served content type comprises the BSS determining the RN-served content type,
    wherein selecting one of the plurality of base stations to serve the RN based on both the determined BSS-served content type and the determined RN-served content type comprises the BSS selecting one of the plurality of base stations to serve the RN based on both the determined BSS-served content type and the determined RN-served content type, and
    wherein causing the selected base station to serve the RN comprises the BSS causing the selected base station to serve the RN.

3. The method of claim 1,
    wherein determining the BSS-served content type comprises the RN determining the BSS-served content type,
    wherein determining the RN-served content type comprises the RN determining the RN-served content type,
    wherein selecting one of the plurality of base stations to serve the RN based on both the determined BSS-served content type and the determined RN-served content type comprises the RN selecting one of the plurality of base stations to serve the RN based on both the determined BSS-served content type and the determined RN-served content type, and
    wherein causing the selected base station to serve the RN comprises the RN causing the selected base station to serve the RN.

4. The method of claim 1, wherein at least some of the plurality of base stations are co-located.

5. The method of claim 1, wherein at least some of the plurality of base stations are at different locations from one another.

6. The method of claim 1, wherein selecting one of the plurality of base stations to serve the RN comprises:
    determining that the BSS-served content type is of a first data-quantity level;
    determining that the RN-served content type is of a second data-quantity level; and
    based on the determined first and second data-quantity levels, selecting one of the plurality of base stations to serve the RN.

7. The method of claim 1, wherein the wireless communication system comprises data storage containing mapping data that maps (i) each of various combinations of BSS-served content type and RN-served content type with (ii) a respective one of the base stations of the plurality of base stations, and wherein selecting one of the plurality of base stations comprises:
    making a determination that the mapping data maps a combination of the determined BSS-served content type and the determined RN-served content type with a particular base station; and
    based on the determination, selecting the particular base station to serve the RN.

8. The method of claim 1,
    wherein the plurality of base stations comprises at least first and second base stations,
    wherein determining a type of content communicated between the BSS and UEs served by the BSS comprises (a) determining a first BSS-served content type communicated between the first base station and UEs served by the first base station and (b) determining a second BSS-served content type communicated between the second base station and UEs served by the second base station, and
    wherein selecting one of the plurality of base stations comprises:
    making a comparison between at least (i) a first pairing of the determined first BSS-served content type and the determined RN-served content type and (ii) a second pairing of the determined second BSS-served content type and the determined RN-served content type; and
    based on the comparison, selecting one of the first and second base stations to serve the RN.

9. The method of claim 8, wherein making the comparison comprises making a determination of whether the first and second pairings are each permitted, and wherein selecting one of the first and second base stations to serve the RN comprises:
    if the determination is that only the first pairing is permitted, then, responsive to making the determination, selecting the first base station;
    if the determination is that only the second pairing is permitted, then, responsive to making the determination, selecting the second base station; and
    if the determination is that the first and second pairings are both permitted or that the first and second pairings are both not permitted, then, responsive to making the determination, making a further comparison between the first and second base stations.

10. The method of claim 9, wherein making the further comparison comprises:
   determining a first count of RNs that the first base station serves;
   determining a second count of RNs that the second base station serves;
   making a further determination of whether (i) the first count is lower than the second count or rather (ii) the second count is lower than the first count;
   if the further determination is that the first count is lower than the second count, then, responsive to making the further determination, selecting the first base station to serve the RN; and
   if the further determination is that the second count is lower than the first count, then, responsive to making the further determination, selecting the second base station to serve the RN.

11. A wireless communication system comprising:
   a relay node (RN) operable to serve user equipment devices (UEs);
   a base station system (BSS) that includes a plurality of base stations each operable to serve UEs and operable to serve the RN, wherein each base station is configured to provide service on at least one carrier; and
   a controller configured to cause the wireless communication system to perform operations comprising:
      determining a type of content communicated between the BSS and UEs served by the BSS (BSS-served content type);
      determining a type of content communicated between the RN and UEs served by the RN (RN-served content type);
      based on both the determined BSS-served content type and the determined RN-served content type, selecting one of the plurality of base stations to serve the RN; and
      causing the selected base station to serve the RN.

12. The wireless communication system of claim 11, wherein the controller is part of the BSS and causes the BSS to perform the operations.

13. The wireless communication system of claim 11, wherein the controller is part of the RN and causes the RN to perform the operations.

14. The wireless communication system of claim 11, wherein selecting one of the plurality of base stations to serve the RN comprises:
   determining that the BSS-served content type is of a first data-quantity level;
   determining that the RN-served content type is of a second data-quantity level; and
   based on the determined first and second data-quantity levels, selecting one of the plurality of base stations to serve the RN.

15. The wireless communication system of claim 11, further comprising data storage containing mapping data that maps (i) each of various combinations of BSS-served content type and RN-served content type with (ii) a respective one of the base stations of the plurality of base stations, wherein selecting one of the plurality of base stations comprises:
   making a determination that the mapping data maps a combination of the determined BSS-served content type and the determined RN-served content type with a particular base station; and
   based on the determination, selecting the particular base station to serve the RN.

16. The wireless communication system of claim 11,
   wherein the plurality of base stations comprises at least first and second base stations,
   wherein determining a type of content communicated between the BSS and UEs served by the BSS comprises (a) determining a first BSS-served content type communicated between the first base station and UEs served by the first base station and (b) determining a second BSS-served content type communicated between the second base station and UEs served by the second base station, and
   wherein selecting one of the plurality of base stations comprises:
      making a comparison between at least (i) a first pairing of the determined first BSS-served content type and the determined RN-served content type and (ii) a second pairing of the determined second BSS-served content type and the determined RN-served content type; and
      based on the comparison, selecting one of the first and second base stations to serve the RN.

17. The wireless communication system of claim 16, wherein making the comparison comprises making a determination of whether the first and second pairings are each permitted, and wherein selecting one of the first and second base stations to serve the RN comprises:
   if the determination is that only the first pairing is permitted, then, responsive to making the determination, selecting the first base station;
   if the determination is that only the second pairing is permitted, then, responsive to making the determination, selecting the second base station; and
   if the determination is that the first and second pairings are both permitted or that the first and second pairings are both not permitted, then, responsive to making the determination, making a further comparison between the first and second base stations.

18. The wireless communication system of claim 17, wherein making the further comparison comprises:
   determining a first priority level of the first pairing;
   determining a second priority level of the second pairing;
   making a further determination of whether (i) the first priority level is higher than the second priority level or rather (ii) the second priority level is higher than the first priority level;
   if the further determination is that the first priority level is higher than the second priority level, then, responsive to making the further determination, selecting the first base station to serve the RN; and
   if the further determination is that the second priority level is higher than the first priority level, then, responsive to making the further determination, selecting the second base station to serve the RN.

19. A non-transitory computer readable medium having stored thereon instructions executable by a processor to cause a wireless communication system to perform operations, the wireless communication system including a base station system (BSS), wherein the base station system (BSS) comprises a plurality of base stations each operable to serve user equipment devices (UEs) and operable to serve a relay node (RN), wherein the RN is in turn operable to serve UEs, and wherein each base station is configured to provide service on at least one carrier, the operations comprising:
   determining a type of content communicated between the BSS and UEs served by the BSS (BSS-served content type);

determining a type of content communicated between the RN and UEs served by the RN (RN-served content type);

based on both the determined BSS-served content type and the determined RN-served content type, selecting one of the plurality of base stations to serve the RN; and causing the selected base station to serve the RN.

20. The non-transitory computer readable medium of claim 19, wherein at least some of the plurality of base stations are co-located.

* * * * *